Patented Apr. 20, 1937

2,077,393

UNITED STATES PATENT OFFICE 2,077,393

PAPER MANUFACTURE

Arthur Minard Brooks, Andover, Mass., assignor to Raffold Process Corporation, a corporation of Massachusetts No Drawing. Application September 26, 1934, Serial No. 745,649

19 Claims. (Cl. 92—21)

My invention relates to the manufacture of paper containing water-insoluble or substantially water-insoluble oxalates.

The principal object of my invention is to manufacture paper of high quality particularly as to opacity and whiteness by the utilization of a substantially water-insoluble oxalate as a filler.

An important object of my invention is to produce printing papers of superior whiteness, opacity, and printing qualities containing a high percentage of a substantially water-insoluble oxalate as a filler.

A further object of my invention is to produce sized filled paper containing a substantially water-insoluble oxalate as a filler.

A further object of my invention is to produce unsized filled paper containing a substantially water-insoluble oxalate as a filler.

A further object of my invention is to produce an improved coated paper using a substantially water-insoluble oxalate as a pigment of the coating.

A further object of my invention is to provide a process whereby a water-insoluble oxalate may be prepared in connection with the treatment of liquors in alkaline pulp manufacture.

Other objects and advantages of my invention will become apparent during the course of the following description.

In the manufacture of certain types of paper, inorganic fillers are customarily used to impart certain desired qualities as for example smoother surface, greater opacity, and improved printing characteristics. Fillers widely employed are of the type of clay and the like which are substantially inert, and of the type of calcium carbonate and the like which are not inert, to the chemicals used in the paper manufacturing process.

The calcium carbonate type of fillers which are known as alkaline fillers have recently proven to be of especial value in paper, but they have the disadvantage that special procedures must be used therewith either in unsized or sized papers to give the best results, or even in certain cases to give any commercially satisfactory results at all. Thus there is a need for fillers which shall possess the properties of the alkaline fillers in regard to imparting opacity, whiteness and good printing qualities to paper but which shall be substantially more chemically inert in the paper manufacturing process than alkaline fillers and which shall be available at low cost. This need is met by my invention of the use of fillers of the class described herein and by the provision of processes by which they may be efficiently and economically produced.

The fillers which I employ may be designated as water-insoluble or substantially water-insoluble oxalates and may be considered chemically as compounds containing alkaline earth metal or other metallic radicle and oxalate radicle, with or without the presence of water of hydration and/or crystallization, and which thus include basic or other oxalates. There are a number of suitable oxalates and I confine myself to those which are substantially white in color and substantially insoluble in water. These include oxalates such as those of aluminum, manganese, zinc, barium, strontium, calcium, magnesium, lead, antimony, bismuth, and titanium and for the purpose of brevity of expression I refer to them as "oxalate fillers". The particular oxalate filler which I may employ in any given instance depends upon its availability at the point of use and its relative cost for the grade of paper to be made, since the oxalate fillers vary in cost according to the elements which they contain.

Certain of the oxalates, such as calcium oxalate, while producing papers of excellent quality, do not have so high an index of refraction as certain other of the oxalate fillers, such for example as barium, and particularly zinc, bismuth, antimony, lead, titanium and the like. Therefore where especially high opacity is desired, I may use one or more of the latter group, and in substantially lesser quantity if desired, although even in such lesser quantity the cost of such use may be greater because of the substantially higher cost of this latter group, or at least certain members thereof.

However in most cases, as the oxalates of calcium and magnesium are easily prepared at low cost due to the ready availability and low cost of the compounds used in their preparation, these oxalate fillers may be more widely employed than those oxalate fillers which require more expensive materials in their preparation. Thus in the course of the following description the use of calcium oxalate and also its preparation will be shown as a preferred example of the use and preparation of oxalate fillers according to my invention.

In the preparation of an oxalate filler the particle size may be controlled, for example, by regulating the temperature of the reaction by which it is produced. In general, conditions favoring low temperature will produce an oxalate filler of finer particle size than conditions favoring high temperature. For use in papermaking certain grades of paper require the use of oxalate fillers of very fine particle size to obtain the best results particularly as to finish, opacity and printing qualities whereas in certain other grades and types of paper oxalate fillers of somewhat coarser particle size may be employed to advantage.

In certain cases, calcium oxalate of suitable quality for use in papermaking may be available and therefore it may not be necessary to give consideration to its preparation. However in certain other cases where it is not so available it may be prepared according to the processes herein described. One process of preparation, for example, is by the treatment of a soluble alkali metal oxalate, (alkali metal as used herein intending to include the hypothetical alkali metal "ammonium"), with a soluble salt of calcium, producing calcium oxalate and a salt of the alkali metal.

The alkali metal oxalate which may be used in the preparation of the calcium oxalate, as for example sodium oxalate which I preferably employ, may be obtained on the market or prepared by any of the known processes. Such processes may be employed as those which involve the treatment of cellulosic material, starch or the like with concentrated alkalies, or the treatment of an alkali metal carbonate, such as sodium carbonate with carbon monoxide under pressure to form sodium formate which is subsequently heated either alone under pressure or with sodium carbonate to form sodium oxalate, or the treatment of an alkali metal hydroxide such as sodium hydroxide with carbon monoxide to form sodium formate which is subsequently converted to sodium oxalate as stated.

Since in the manufacture of certain printing papers, such as for example book or magazine papers, a considerable quantity of pulp is used which has been prepared by a so-called alkaline process, as for example the soda process, and many mills manufacturing this type of paper have soda pulp mills on the same premises, I prefer in such instances to prepare in the soda pulp mill the calcium oxalate which is to be used as the filler. This procedure has marked advantages in economy of operation and ease of transportation of the filler. By such a method the sodium carbonate recovered from the liquors which have been used in pulp manufacture may be treated, for example, with carbon monoxide under pressure to yield sodium formate, which may then be heated either alone or with sodium carbonate to form sodium oxalate. This sodium oxalate thus obtained may be treated with lime to obtain the calcium oxalate which I desire together with sodium hydroxide for reuse in the production of pulp. This latter operation would of course take the place of the causticizing operation usually employed in pulp mills of this type.

It is preferable to have the lime first thoroughly slaked with water before the sodium oxalate solution is added and to control the reaction as to temperature and concentration so as to produce calcium oxalate of the desired particle size and sodium hydroxide of a suitable concentration. In the event that the calcium oxalate should possess an objectionable alkaline reaction this may be reduced or eliminated if desired, as by treatment with an acidic material such as oxalic acid or alum.

If desired a dolomitic lime or other magnesium containing lime may be used. In such case, however, unless special treatment is given, such for example, as addition of oxalic acid, the insoluble product may also contain magnesium hydroxide.

At those paper mills desiring to produce and to employ oxalate fillers which either do not have alkaline pulp mills in which the filler could be prepared or which do not desire to prepare the filler in such pulp mill, a cyclic procedure for preparing the filler may be employed. Such a procedure would entail the formation of sodium formate from caustic soda and carbon monoxide or producer gas, the conversion of the sodium formate to sodium oxalate in known manner, the treatment of sodium oxalate with lime, for example, to produce caustic soda for reuse in the process and calcium oxalate. It is of course not necessary to produce the calcium oxalate at the paper mill since it may be prepared at any point and shipped to its point of use.

For use in papermaking the calcium oxalate may be employed either alone or with other oxalate fillers or in combination with other fillers. The calcium oxalate may be mixed with the paper pulp in the beater or added to the fibrous mix at any point in the process before web formation. In this way the oxalate filler may be incorporated uniformly throughout the pulp mass. It is also possible, however, to apply the oxalate filler to the already formed web either while it is still on the web-forming device, or while it is still in the wet condition after it has left the web-forming device or after it has been partially or completely dried. Known devices are available for the application of filler to the paper web under these conditions and the oxalate filler may be thus applied to one or both sides of the paper, either alone or in combination with adhesives as casein, starch and the like.

I have found that by using oxalate fillers, it is possible to accomplish the sizing of the sheet by means of ordinary sizing procedures, as for example by the use of rosin size and alum, but other known sizes such as wax sizes may be employed.

The paper which may be produced has an unexpectedly high quality as to whiteness of color, opacity, and printing characteristics. It may be made in the unsized or sized grades as desired. To obtain the maximum advantage from the use of this type of filler, it is recommended that it be used in substantial quantities in the paper, which in certain unsized grades, for example, may be in the neighborhood of 20 to 25%.

The following are preferred examples of paper furnishes which I may employ.

*Furnish A*

|  | Lbs. |
|---|---|
| Sulphite pulp | 500 |
| Soda pulp | 500 |
| Old paper stock (deinked) | 600 |
| Calcium oxalate | 400 |
| Starch | 25 |
| Alum | 20 |

*Furnish B*

|  | Lbs. |
|---|---|
| Sulphite pulp | 834 |
| Soda pulp | 834 |
| Calcium oxalate | 332 |
| Rosin size | 16 |
| Alum | 24 |

I use the term "old paper stock" as it is customarily used in the art to mean stock made by deinking printed paper.

I am aware that oxalic acid has been considered for use in connection with the manufacture of paper and that from this source some calcium oxalate may appear in the paper. My invention does not relate to such adventitious or inconsequential presence of calcium oxalate in paper and I am not concerned with the presence of such minor quantities therein as in the neighborhood of 1 or 2 per cent. based on the weight of the paper, since to obtain the beneficial results which I desire it is necessary to employ calcium oxalate filler in much greater amounts, 5 per cent. being usually the absolute minimum, and 10-30 per cent. being preferred. However in the case of certain oxalates, other than calcium or magnesium oxalates, amounts up to 5 per cent. are sometimes useful, particularly in the case of higher opacity oxalates, as zinc, lead and titanium. Moreover I do not prepare my oxalate filler directly in the paper mix but confine myself exclusively to oxalates prepared previously or preformed prior to their introduction into the fibrous mix.

Inasmuch as certain oxalates which are substantially water-insoluble are more or less soluble in acids, I prefer to adjust the paper mixes in which I employ them to a pH not much lower than 5.5 or 6 or thereabouts so as to avoid the solubilizing effect of the acid. Another method of avoiding such solubilizing effect, which method may be used in furnishes of such acidity as indicated or even in more acid furnishes, is to add either the oxalate filler or the acidic material or both to the mix under conditions favoring the minimizing of the time of contact of the constituents of the mix, which is at any time subsequent to the beater and prior to delivery of the mix to the web-forming device; or preferably under conditions favoring the minimizing of the time and intimacy of contact of the constituents of the mix, which is at or subsequent to the point of dilution of the mix prior to its delivery to the web-forming device.

Due to the excellent covering properties of the oxalate fillers, they may also be employed as coating pigments for coated paper production producing papers of a high degree of whiteness and yielding coatings of high opacity and covering power. In this connection, any oxalate filler may be used alone, in combination with other oxalate fillers or other coating pigments with different characteristics such as clay, satin white, or the like in coating mixes containing adhesives as starch or casein and applied on known types of paper coating machines.

Where I speak of a paper containing filler distributed "substantially uniformly therethrough", I mean such distribution as would normally occur in the formation of a sheet on a web-forming device such for example as a Fourdrinier or cylinder machine despite the fact that owing to the process of sheet formation, there may be a slight absolute inequality of the filler distribution.

Where I set out above the use of oxalates under minimizing conditions such for example as under conditions minimizing the time, it will be understood that this minimizing, among other things, tends to reduce the amount of oxalate which may be dissolved by the acidity of the mix.

Whereas I have stated that I prefer to run my mixes containing oxalate filler at a pH not below 5.5 or 6, it is not thereby to be understood that I cannot run them at a higher pH. If desired I may run such mixes substantially neutral, which is at a pH of 7, or even on the alkaline side, which is at a pH of above 7, but I prefer to run them slightly on the acid side as stated.

While as stated above I may use oxalate fillers either alone or in association with other fillers in filled paper, I prefer to use oxalate filler as the only filler in my paper, or at least in the absence of any alkaline filler.

It is apparent that by my invention I have produced not only filled and/or coated paper of exceptional and unanticipated high quality, but have provided an economical method for the preparation of an oxalate filler in combination with the preparation of pulp. As will be understood these novel results are of considerable economic value and will have an important bearing on the production of filled and coated papers.

Paper and paper board of various weights, types and kinds may be made in accordance with my invention using furnishes containing various types and kinds of fibrous material and paper forming stock.

By the term "printing paper" as used in the claims hereof I mean flexible paper containing varying amounts of loading material and having a substantially smooth surface adapted to receive printing ink, such as is used in magazines, books, catalogues, pamphlets, newspapers, and the like.

While I have described in detail the preferred embodiment of my invention, it is to be understood that the details of procedure, the proportions of ingredients, and the arrangement of steps may be widely varied without departing from the spirit of my invention or the scope of the subjoined claims.

I claim:

1. Substantially white printing paper comprising fibrous material and at least five per cent. by weight of substantially white substantially water-insoluble oxalate filler.

2. Substantially white sized filled printing paper comprising fibrous material, sizing, and at least five per cent. by weight of substantially white substantially water-insoluble oxalate filler distributed substantially uniformly therethrough.

3. Substantially white unsized filled printing paper comprising fibrous material, and at least five per cent. by weight of substantially white substantially water-insoluble oxalate filler distributed substantially uniformly therethrough.

4. Substantially white printing paper comprising fibrous material and at least five per cent. by weight of calcium oxalate.

5. Substantially white sized filled printing paper comprising fibrous material, sizing, and at least five per cent. by weight of calcium oxalate distributed substantially uniformly therethrough.

6. Substantially white unsized filled printing paper comprising fibrous material, and at least five per cent. by weight of calcium oxalate distributed substantially uniformly therethrough.

7. Substantially white printing paper comprising fibrous material and substantially white substantially water-insoluble oxalate filler of refractive index higher than that of calcium oxalate.

8. Substantially white filled printing paper comprising fibrous material and substantially white substantially water-insoluble oxalate filler of refractive index higher than that of calcium oxalate distributed substantially uniformly therethrough.

9. Substantially white printing paper comprising fibrous material and substantially white substantially water-insoluble oxalate filler of refractive index higher than that of calcium oxalate, comprising a zinc oxalate.

10. Substantially white printing paper comprising fibrous material and substantially white substantially water-insoluble oxalate filler of refractive index higher than that of calcium oxalate, comprising a titanium oxalate.

11. Substantially white printing paper comprising fibrous material and substantially white substantially water-insoluble oxalate filler of refractive index higher than that of calcium oxalate, comprising an antimony oxalate.

12. The process of manufacturing substantially white filled printing paper comprising mixing fibrous material, and substantially white substantially water-insoluble oxalate filler in amount greater than five per cent. on the dry weight of the fibrous material, delivering the mix to a web-forming device, and forming paper therefrom.

13. The process of manufacturing substantially white filled printing paper comprising mixing fibrous material, acidic material, and substantially white substantially water-insoluble oxalate filler in amount greater than five per cent. on the dry weight of the fibrous material, delivering the mix to a web-forming device, and forming paper therefrom.

14. The process of manufacturing substantially white filled printing paper wherein at least one of the ingredients is added under conditions favoring the minimizing of the time of contact of the constituents of the mix comprising mixing fibrous material, acidic material, and substantially white substantially water-insoluble oxalate filler in amount greater than five per cent. on the dry weight of the fibrous material, delivering the mix to a web-forming device, and forming paper therefrom.

15. The process of manufacturing substantially white filled printing paper comprising mixing fibrous material, alum, and substantially white substantially water-insoluble oxalate filler in amount greater than five per cent. on the dry weight of the fibrous material, delivering the mix to a web-forming device, and forming paper therefrom.

16. The process of manufacturing substantially white filled printing paper comprising mixing fibrous material, size, acidic material, and substantially white substantially water-insoluble oxalate filler in amount greater than five per cent. on the dry weight of the fibrous material, delivering the mix to a web-forming device, and forming paper therefrom.

17. The process of manufacturing substantially white filled printing paper comprising providing a wet fibrous web which comprises fibrous material and at least five per cent. of substantially white substantially water-insoluble oxalate filler, and drying said web.

18. The process of manufacturing substantially white filled printing paper comprising providing a wet fibrous web which comprises fibrous material and substantially white substantially water-insoluble oxalate filler of refractive index higher than that of calcium oxalate, and drying said web.

19. The process of manufacturing substantially white filled printing paper comprising delivering an aqueous fibrous mix to a web-forming device, incorporating substantially white substantially water-insoluble oxalate filler with the fibrous material on said web-forming device, passing the web containing said fibrous material and said oxalate filler from said web-forming device, and drying said web.

ARTHUR MINARD BROOKS.